United States Patent [19]

Bayley et al.

[11] Patent Number: 5,492,365
[45] Date of Patent: Feb. 20, 1996

[54] METHOD AND APPARATUS FOR INFLATING AN INFLATABLE VEHICLE OCCUPANT RESTRAINT

[75] Inventors: Gregory S. Bayley, Dryden; Pongdet P. Wipasuramonton, Rochester, both of Mich.; Terrence J. Coultas, Canyon Country, Calif.; Larry E. Cisney, Imlay City, Mich.

[73] Assignee: TRW Vehicle Safety Systems Inc., Lyndhurst, Ohio

[21] Appl. No.: 306,012

[22] Filed: Sep. 14, 1994

[51] Int. Cl.⁶ .................................................. B60R 21/28
[52] U.S. Cl. ................................................ 280/741; 222/3
[58] Field of Search ............................... 280/741; 222/3, 222/5; 102/530, 531

[56] References Cited

U.S. PATENT DOCUMENTS

3,869,143  3/1975  Merrell .................................. 280/741
4,817,828  4/1989  Goetz ........................................ 222/3

Primary Examiner—Margaret A. Focarino
Assistant Examiner—Christopher Ellis
Attorney, Agent, or Firm—Tarolli, Sundheim & Covell

[57] ABSTRACT

A method and apparatus are provided for igniting a body (60) of ignitable gas generating material which generates gas for inflating an inflatable vehicle occupant restraint (12). The method includes the step of igniting a body (202) of pyrotechnic material which, when ignited, emits combustion products. The method further includes the step of igniting the body (60) of gas generating material by dispersing the combustion products over an ignitable surface portion (116) of the body (60) of gas generating material. The combustion products are dispersed by moving the body (202) of pyrotechnic material from a first location to a second location when the body (202) of pyrotechnic material is burning. The first and second locations are spaced from each other across the ignitable surface portion (116) of the body (60) of gas generating material.

29 Claims, 5 Drawing Sheets

METHOD AND APPARATUS FOR INFLATING AN INFLATABLE VEHICLE OCCUPANT RESTRAINT

FIELD OF THE INVENTION

The present invention relates to an inflatable vehicle occupant restraint, such as an air bag, and particularly relates to a method and apparatus for inflating an inflatable vehicle occupant restraint.

BACKGROUND OF THE INVENTION

U.S. Pat. No. 4,817,828 discloses an inflator which comprises a source of gas for inflating an inflatable vehicle occupant restraint such as an air bag. The inflator contains a body of ignitable gas generating material. When the vehicle experiences deceleration of at least a predetermined amount which indicates the occurrence of a vehicle collision, the gas generating material in the inflator is ignited. As the gas generating material burns, it generates a large volume of gas which is directed to flow from the inflator into the air bag to inflate the air bag. When the air bag is inflated, it extends into the vehicle occupant compartment to restrain an occupant of the vehicle from forcefully striking parts of the vehicle.

The inflator disclosed in the '828 patent has a cylindrical housing. The housing includes a tubular inner wall and a tubular outer wall. A cylindrical filter is contained in the housing concentrically between the tubular inner wall and the tubular outer wall. The tubular inner wall defines a cylindrical combustion chamber in which the body of gas generating material is contained. An igniter for igniting the body of gas generating material is located at one end of the combustion chamber. A plurality of gas flow openings extend through the tubular inner wall, and thus direct the gas to flow radially outward from the combustion chamber and through the filter toward the tubular outer wall. A plurality of gas flow openings extending through the tubular outer wall similarly direct the gas to flow radially outward from the housing toward the air bag.

The body of gas generating material has substantially the same size and shape as the cylindrical combustion chamber defined by the tubular inner wall of the housing. The body of gas generating material thus has an elongated cylindrical shape with longitudinally opposite ends that are located adjacent to respective opposite ends of the combustion chamber. Moreover, the body of gas generating material is defined by a plurality of separate grains of gas generating material. The grains of gas generating material are arranged concentrically in a row which extends along the length of the combustion chamber. The igniter, which is located at one end of the combustion chamber, is thus located adjacent to the first few grains of gas generating material in the row. As a result of this arrangement, ignition of the body of gas generating material is initiated at the first few grains of gas generating material in the row, and proceeds progressively along the length of the body of gas generating material as successive grains in the row are ignited.

In order to maximize the rate at which ignition progresses along the length of the body of gas generating material, the surface of each grain of gas generating material is coated with a material that is more readily ignitable than the gas generating material of which the grains are formed. The body of gas generating material is thus provided with a coating of an ignition enhancing material which maximizes the rate at which ignition proceeds over the surface of the body of gas generating material. However, such a coating is known to be expensive and difficult to apply.

SUMMARY OF THE INVENTION

In accordance with the present invention, a method and apparatus are provided for igniting a body of ignitable gas generating material which generates gas for inflating an inflatable vehicle occupant restraint.

The method comprises the step of igniting a body of pyrotechnic material which, when ignited, emits combustion products. The method further comprises the step of igniting the body of gas generating material by dispersing the combustion products over an ignitable surface portion of the body of gas generating material. The combustion products are dispersed over the ignitable surface portion of the body of gas generating material by moving the body of pyrotechnic material from a first location to a second location when the body of pyrotechnic material is burning. The first and second locations are spaced from each other across the ignitable surface portion of the body of gas generating material.

The present invention enables a body of ignitable gas generating material to be ignited quickly and substantially uniformly without the use of a surface coating formed of an ignition enhancing material. This is because the combustion products emitted from the body of pyrotechnic material are quickly dispersed over the ignitable surface portion of the body of gas generating material as the body of pyrotechnic material is moved across the ignitable surface portion of the body of gas generating material.

In a preferred embodiment of the apparatus, the body of gas generating material has an elongated cylindrical shape with a longitudinal central axis. The ignitable surface portion of the body of gas generating material is an elongated cylindrical inner surface which defines a passage extending entirely through the body along the axis. The combustion products emitted from the body of pyrotechnic material are confined so as to develop a thrust which acts against the body of pyrotechnic material. The thrust moves the body of pyrotechnic material through the passage in the body of gas generating material. The combustion products are thus dispersed along the entire length of the cylindrical inner surface of the body of gas generating material. As a result, the body of gas generating material is ignited quickly along its entire length.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
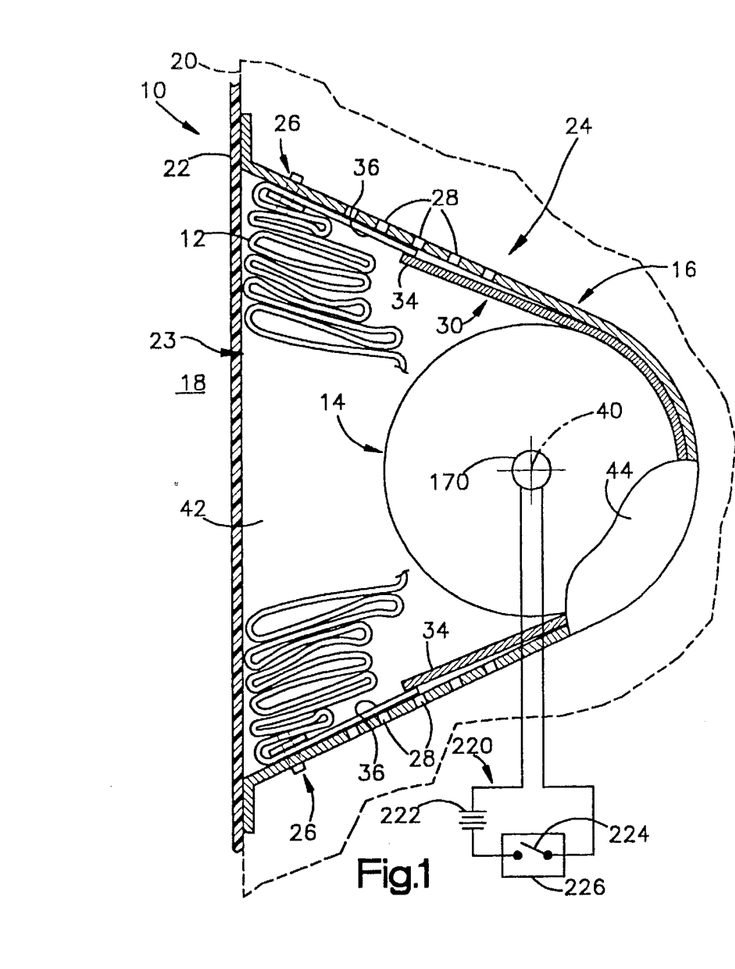
FIG. 1 is a schematic view of a vehicle occupant restraint apparatus comprising a first preferred embodiment of the present invention.
Figure 2:
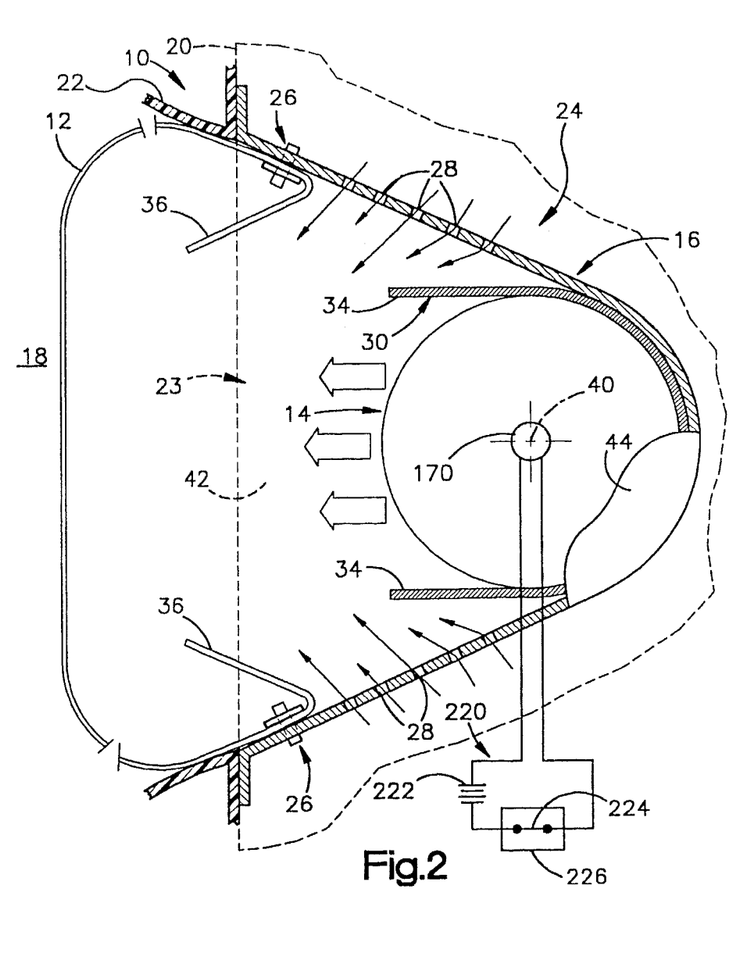
FIG. 2 is a schematic view showing the apparatus of FIG. 1 in an actuated condition.

A vehicle occupant restraint apparatus 10 comprising a first preferred embodiment of the present invention is shown schematically in FIGS. 1 and 2. The apparatus 10 includes an inflatable vehicle occupant restraint 12 which is commonly referred to as an air bag. The apparatus 10 further includes an inflator 14 which comprises a source of gas for inflating the air bag 12.

The air bag 12 and the inflator 14 are housed in a reaction canister 16. The reaction canister 16 is mounted in a part of a vehicle that adjoins the vehicle occupant compartment 18, such as the instrument panel 20 of the vehicle. A deployment door 22 extends over a deployment opening 23 in the reaction canister 16. The deployment door 22 continues the trim theme of the instrument panel 20 across the deployment opening 23, and thus conceals the air bag 12 and the reaction canister 16 from the vehicle occupant compartment 18. The air bag 12, the inflator 14, the reaction canister 16 and the deployment door 22 are parts of an air bag module 24 which is assembled separately from the instrument panel 20.

When the vehicle experiences a predetermined amount of deceleration, such as occurs in a collision, the inflator 14 is actuated. The inflator 14 then emits a large volume of gas which flows into the air bag 12 to inflate the air bag 12 from a stored, folded condition (FIG. 1) to an inflated condition (FIG. 2). As the gas begins to inflate the air bag 12, it moves the air bag 12 outwardly against the deployment door 22. A stress riser (not shown) in the deployment door 22 ruptures under the stress induced by the increasing pressure of the gas flowing into the air bag 12 from the inflator 14. As the gas continues to inflate the air bag 12, it moves the air bag 12 outward through the deployment opening 23 past the deployment door 22, as shown in FIG. 2. The air bag 12 then extends into the vehicle occupant compartment 18 to restrain an occupant of the vehicle from forcefully striking the instrument panel 20 or other parts of the vehicle.

The air bag 12 is connected to the reaction canister 16 by suitable clamping assemblies 26. A plurality of ambient air flow openings 28 extend through the reaction canister 16 between the inflator 14 and the air bag 12. A sheet 30 of foil or the like provides a pair of flaps 34 extending from the inflator 14 over several of the ambient air flow openings 28. Additional flaps 36, which preferably comprise edge portions of the air bag 12, extend from the clamping assemblies 26 over the remainder of the ambient air flow openings 28.

As shown schematically in FIGS. 1 and 2, the inflator 14 has a cylindrical shape with a longitudinal central axis 40, and extends axially between two opposite side walls 42 and 44 of the reaction canister 16. As shown in greater detail in FIG. 3, the inflator 14 has a cylindrical housing 50. The housing 50 includes a tubular outer wall 52, a circular end wall 54, and a circular closure cap 56, each of which is centered on the axis 40. The end wall 54 closes one end of the outer wall 52, and supports a threaded mounting stud 58. The closure cap 56 is screwed into the other end of the outer wall 52, and thus closes the other end of the outer wall 52. An elastomeric O-ring seal 59 is received between the closure cap 56 and the outer wall 52.

Figure 3:
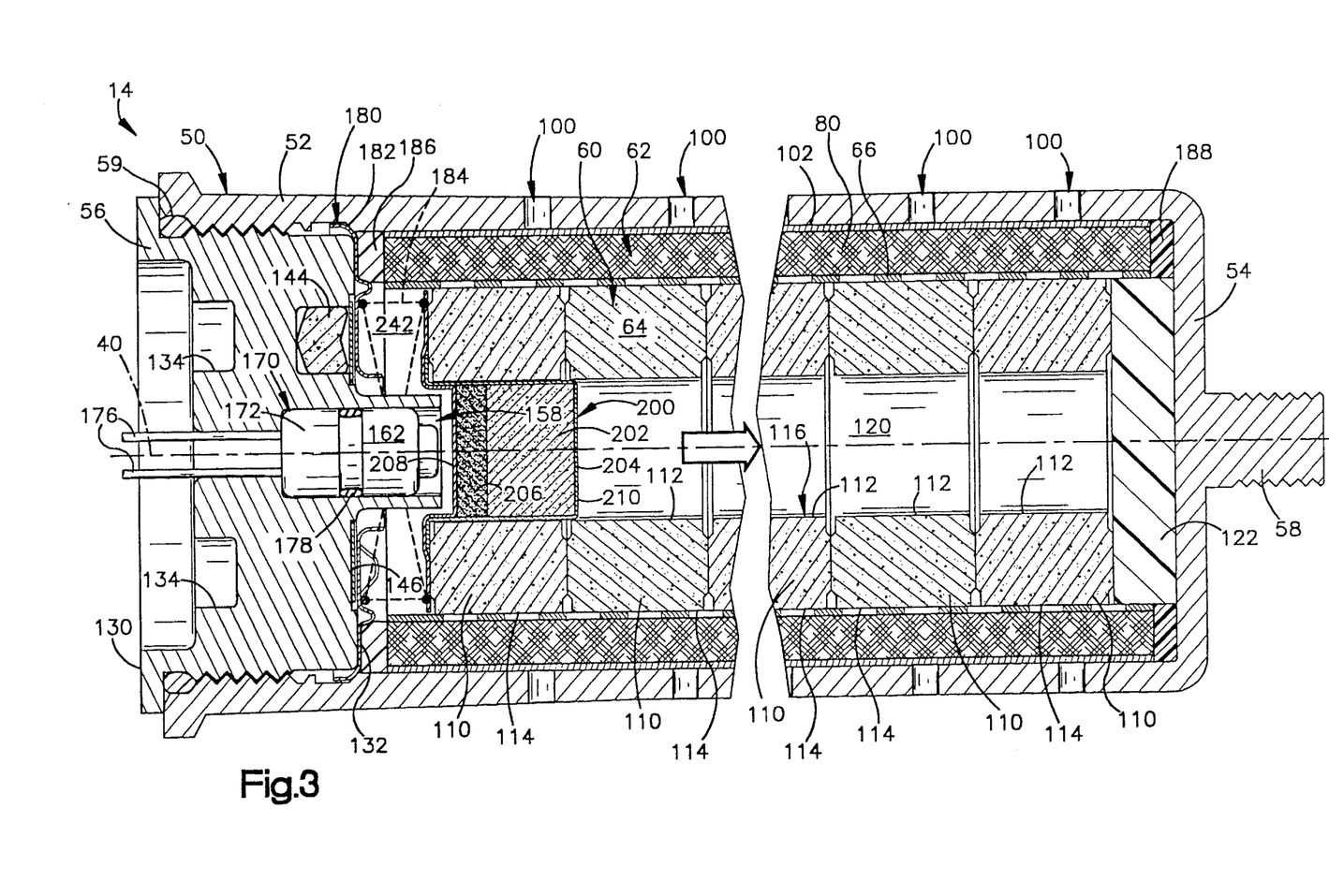
FIG. 3 is a sectional view of parts of the apparatus of FIG. 1.

The housing 50 contains an elongated cylindrical body 60 of ignitable gas generating material. The housing also contains a tubular structure 62. The tubular structure 62 defines a cylindrical combustion chamber 64 in which the body 60 of gas generating material is located.

Figure 4:
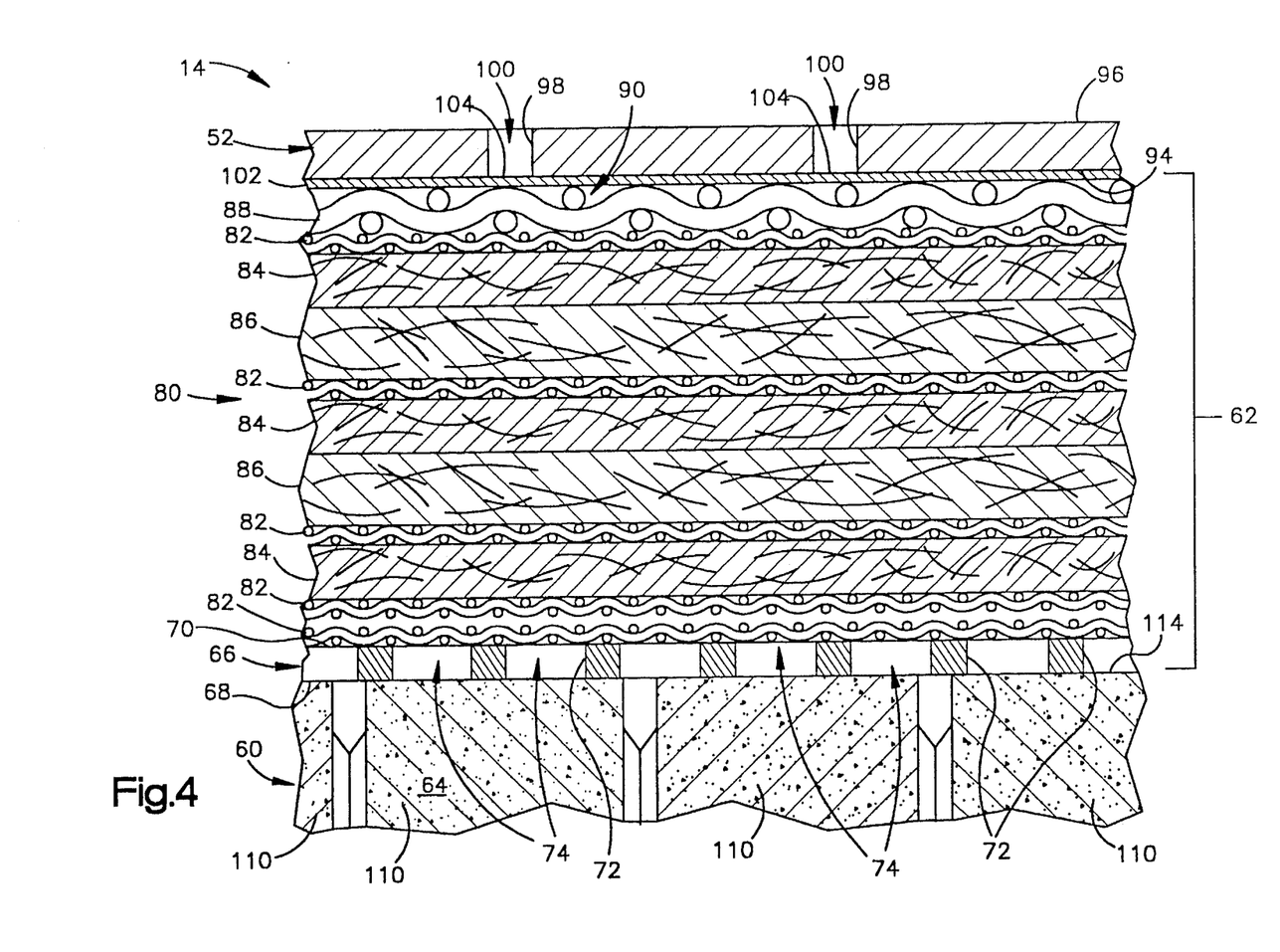
FIG. 4 is an enlarged sectional view of parts shown in FIG. 3.

As shown in enlarged detail in FIG. 4, the tubular structure 62 has a tubular inner wall 66. The inner wall 66 has a cylindrical inner side surface 68 and a cylindrical outer side surface 70. The inner side surface 68 defines the cylindrical combustion chamber 64 in which the body 60 of gas generating material is located. The inner wall 66 further has a plurality of cylindrical inner edge surfaces 72, each of which defines a gas flow opening 74 extending radially through the inner wall 66. Preferably, the inner wall 66 is formed by perforating a sheet of metal to form the openings 74, and by welding the opposite longitudinal edges of the sheet together to form a cylindrical tube.

The tubular structure 62 further includes a generally cylindrical filter 80 which extends circumferentially around the inner wall 66. The filter 80 has a plurality of generally cylindrical filter layers, including layers 82 of wire mesh screen, layers 84 of steel wool, and layers 86 of ceramic/glass wool. The layers 82–86 are formed by laying out flat, flexible sheets of steel wool and ceramic/glass wool in overlying relationship with a flat, flexible sheet of wire mesh screen, and by winding the overlying sheets around the inner wall 66.

The filter 80 also has an optional outer layer 88 of wire mesh screen. The outer layer 88 is formed by wrapping another sheet of wire mesh screen around the layers 82–86 of the filter 80, and by welding the outer layer 88 to the adjacent layer 82 of wire mesh screen. The wire mesh screen of the outer layer 88 has openings that are larger than the openings in any of the underlying layers 82 of wire mesh screen. A plenum 90 is thus defined by the space between the interwoven screen wires of which the outer layer 88 is formed. Alternatively, the outer layer 88 could be omitted from the filter 80.

As further shown in FIG. 4, the tubular outer wall 52 of the housing 50 has a cylindrical inner side surface 94, a cylindrical outer side surface 96, and a plurality of cylindrical inner edge surfaces 98 which define gas flow openings 100 extending radially through the outer wall 52. A sheet 102 of rupturable pressure controlling material, which is preferably formed of aluminum foil, extends circumferentially around the inner side surface 94 of the outer wall 52 in continuous contact with the inner side surface 94. The sheet 102 thus has a plurality of individual circular portions 104, each of which extends across the inner end of a respective one of the gas flow openings 100 in the outer wall 52.

The sheet 102 of rupturable pressure controlling material is preferably adhered to the outer wall 52 of the housing 50. The tubular structure 62, which includes the tubular inner wall 66 and the filter 80, is received coaxially within the outer wall 52. When the tubular structure 62 is thus received within the outer wall 52, the outer layer 88 of wire mesh screen in the filter 80 adjoins the sheet 102 of pressure controlling material.

The body 60 of gas generating material is defined by a plurality of separate ring shaped pieces 110 of gas generating material which are known as grains. Each of the grains 110 of gas generating material has a cylindrical inner surface 112 (FIG. 3) and a cylindrical outer surface 114. The grains 110 are received coaxially within the combustion chamber 64, with the cylindrical outer surfaces 114 adjoining the cylindrical inner side surface 68 of the tubular inner wall 66. The cylindrical inner surfaces 112 are all centered on the axis 40, and are all of equal diameter. The cylindrical inner surfaces 112 are thus aligned with each other so as to define a substantially continuous, elongated ignitable surface 116 of the body 60 of gas generating material, which also has a cylindrical shape centered on the axis 40. The ignitable surface 116, in turn, defines an elongated cylindrical passage 120 which extends along the axis 40 throughout the entire length of the body 60.

The gas generating material of which the body 60 is formed may have any suitable composition known in the art. It is known in the art to provide a body of gas generating material with a coating formed of a material which is more readily ignitable, and which thus enhances the ignition of the gas generating material. However, in accordance with the present invention, such a coating is not required on the ignitable surface 116 of the body 60 of gas generating material. Therefore, each of the grains 110 of gas generating material is preferably free of such a coating at the respective cylindrical inner surface 112 so that the respective portion of the ignitable surface 116 is free of such a coating. All of the grains 110, and thus the entire body 60, are most preferably entirely free of such a coating.

The grains 110 of gas generating material may have additional cylindrical inner surfaces for defining additional passages that extend axially through the grains 110 at locations spaced radially outward from the passage 120. The additional inner surfaces would increase the total ignitable surface area of the body 60, and the additional passages would increase fluid communication between the grains 110. The ignition of the body 60 would be enhanced accordingly. Such additional inner surfaces of the grains 110 would preferably be constructed in accordance with the invention set forth in U.S. Pat. No. 4,817,828.

An elastomeric pad 122 is placed between the end wall 54 and the adjacent grain 110 of gas generating material to hold the grains 110 securely in place, as well as to protect the grains 110 from being broken upon assembly of the inflator 14. A hermetic seal for protecting the body 60 of gas generating material could be provided in the housing 50, and could comprise any suitable structure known in the art.

Figure 5:
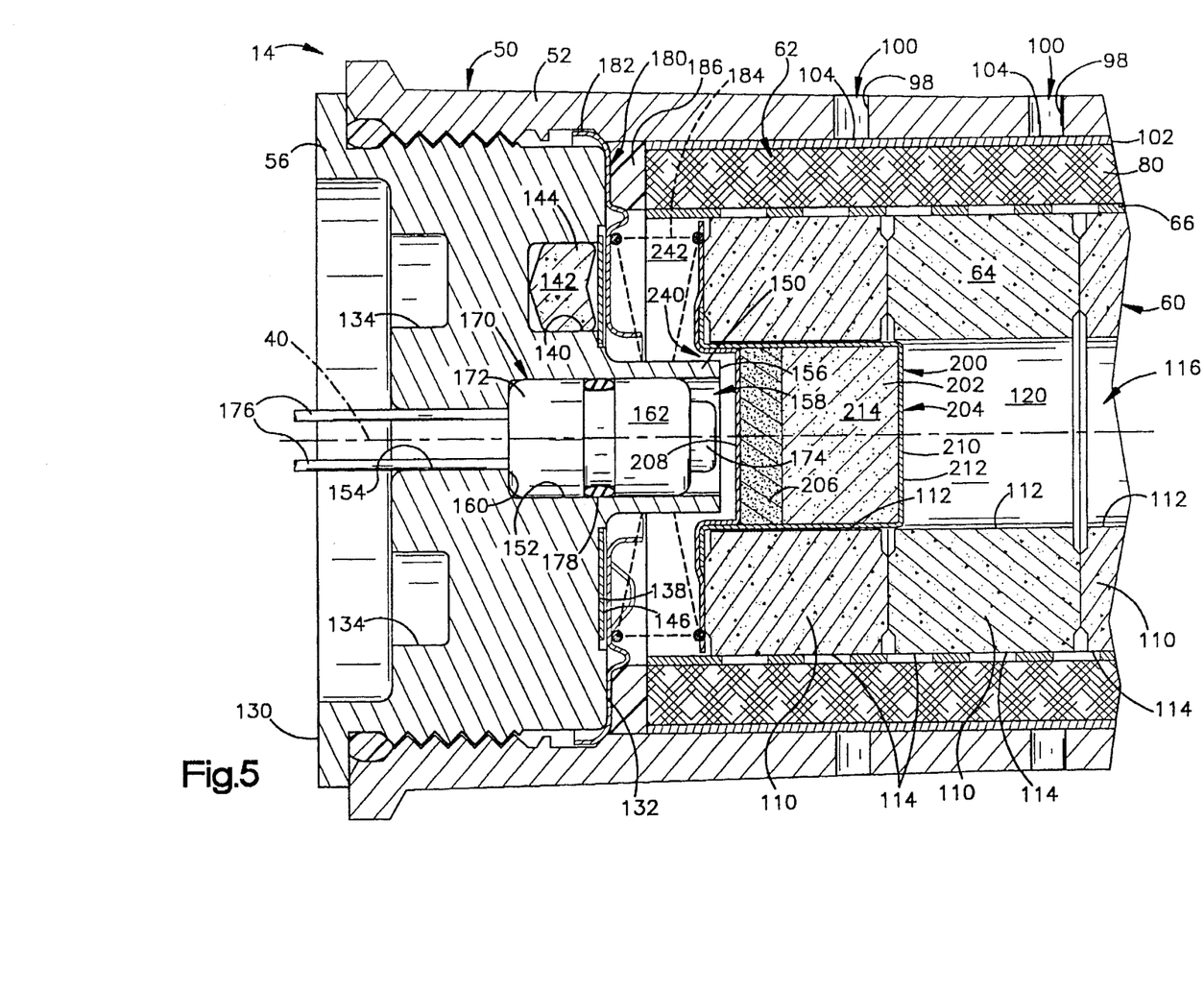
FIG. 5 also is an enlarged sectional view of parts shown in FIG. 3.

As shown in enlarged detail in FIG. 5, the closure cap 56 has an outer side surface 130 facing outward along the axis 40, and has an inner side surface 132 facing inward along the axis 40. The outer side surface 130 includes a plurality of recessed surface portions 134. The recessed surface portions 134 are designed to mate with projecting surface portions of a tool (not shown) that engages the closure cap 56 to screw the closure cap 56 into the tubular outer wall 52 upon assembly of the inflator 14.

The inner side surface 132 of the closure cap 56 includes a first recessed surface portion 138 and a second recessed surface portion 140. The first recessed surface portion 138 has an annular shape centered on the axis 40. The second recessed surface portion 140 defines a compartment 142 with an open end at the first recessed surface portion 138. A piece 144 of auto-ignition material, which may have any suitable composition known in the art, is contained in the compartment 142. An annular strip of metal foil tape 146 extends circumferentially around the first recessed surface portion 138 and over the open end of the compartment 142. The tape 146 is fixed to the first recessed surface portion 138 by any suitable means, such as by an adhesive, and thus establishes a hermetic seal which closes the open end of the compartment 142.

The closure cap 56 further has a projecting portion 150, a first cylindrical inner surface 152, and a second cylindrical inner surface 154, each of which is centered on the axis 40. The projecting portion 150 projects axially from the inner side surface 132, and includes part of the first cylindrical inner surface 152. An annular end surface 156 of the projecting portion 150 defines a circular opening 158 which also is centered on the axis 40.

The first cylindrical inner surface 152 of the closure cap 56 extends axially from the opening 158 to an annular inner surface 160 of the closure cap 56. A cylindrical compartment 162 is thus defined between the annular inner surface 160 and the opening 158. The second cylindrical inner surface 154 of the closure cap 56 has a diameter which is less than the diameter of the first cylindrical inner surface 152, and extends axially from the annular inner surface 160 to the outer side surface 130.

The inflator 14 further includes a squib 170 which is supported by the closure cap 56. The squib 170 is of known construction and, as shown in FIG. 5, has a cylindrical metal casing 172 which is received in the compartment 162. The casing 172 has a rupturable forward end portion 174 adjacent to the opening 158 in the closure cap 56. A pair of lead wires 176 extend from the casing 172 to the exterior of the housing 50 through a passage defined by the second cylindrical inner surface 154 of the closure cap 56.

The casing 172 contains a pyrotechnic material which is ignited upon the passage of electric current through the squib 170 between the lead wires 176. When the pyrotechnic material in the casing 172 is ignited, it produces combustion products which rupture the forward end portion 174 of the casing 172 and emerge from the casing 172. An elastomeric O-ring 178 provides a hermetic seal between the casing 172 and the first cylindrical inner surface 152 of the closure cap 56. The closure cap 56 and the O-ring 178 thus support the squib 170 in a position from which it will spew the combustion products outward from the casing 172 and through the opening 158 in a direction from the left to the right along the axis 40, as viewed in FIG. 5.

A retainer assembly 180 also is contained in the housing 50. As shown in FIGS. 3 and 5, the retainer assembly 180 includes a metal retainer ring 182 and a spring 184 (shown schematically). The retainer ring 182 overlies the inner side surface 132 of the closure cap 56, and extends radially outward between the inner side surface 132 and an annular elastomeric sealing ring 186 which adjoins the tubular structure 62. The closure cap 56 presses the retainer ring 182 firmly against the sealing ring 186 and the tubular structure 62. The closure cap 56 thus presses the tubular structure 62 firmly against another annular elastomeric sealing ring 188 (FIG. 3) which adjoins the end wall 54 and encircles the elastomeric pad 122 at the other end of the housing 50.

The spring 184 is compressed axially between the retainer ring 182 and the first grain 110 of gas generating material adjacent to the closure cap 56. The spring 184 thus presses the body 60 of gas generating material firmly against the pad 122 (FIG. 3) that adjoins the end wall 54 at the other end of the housing 50. The spring 184 presses the separate grains 110 of gas generating material together firmly enough to prevent them from rattling within the housing 50, but also provides a compressible cushion which protects the grains 110 from being broken when the closure cap 56 is moved forcefully against the retainer ring 182 upon movement of the closure cap 56 into the installed position shown in FIGS. 3 and 5. The retainer assembly 180 is preferably constructed in accordance with the invention set forth in copending U.S. patent application Ser. No. 129,455, filed Sep. 29, 1993, entitled Air Bag Inflator, and assigned to TRW Vehicle Safety Systems Inc.

Also located in the housing 50 is an igniter assembly 200. The igniter assembly 200 includes a compressed charge pellet 202 and a casing 204 in which the compressed charge pellet 202 is contained. The compressed charge pellet 202 is preferably formed of a pyrotechnic mixture of $TiH_2$ and $KClO_4$, but may alternatively be formed of any other suitable pyrotechnic material known in the art. An optional piece 206 of auto-ignition material also is contained in the casing 204 with the compressed charged pellet 202. Like the piece 144 of auto-ignition material described above, the piece 206 of auto-ignition material may have any suitable composition known in the art.

The casing 204 has a disc shaped base wall 208 and a cup shaped, cylindrical body wall 210. The body wall 210 has a closed end portion 212, and has an open end which is covered by the base wall 208. The base wall 208 and the body wall 210 are formed of a thin sheet metal, such as a thin aluminum sheet metal, and are fixed to each other by any suitable means known in the art, such as by a YAG laser weld. A closed cylindrical chamber 214 is thus defined within the casing 202 between the base wall 208 and the closed end portion 212 of the body wall 210. An adhesive material (not shown) is preferably provided between the adjoining surfaces of the base wall 208 and the body wall 210 to provide a hermetic seal which protects the compressed charge pellet 202 and the piece 206 of auto-ignition material in the chamber 214.

The first grain 110 of gas generating material and the spring 184 hold the base wall 208 in a position centered on the axis 40. An adhesive material may also be provided between the adjoining surfaces of the base wall 208 and the first grain 110 of gas generating material. The body wall 210 of the casing 204 projects axially from the base wall 208 into the passage 120 within the body 60 of gas generating material. Preferably, the diameter of the body wall 210 of the casing 204, and likewise the diameter of the compressed charged pellet 202, is only slightly less than the diameter of the passage 120 so that the body wall 210 and the compressed charge pellet 202 fit closely within the passage 120, as shown in FIGS. 3 and 5.

When the inflator 14 is installed in the reaction canister 16 as shown in FIGS. 1 and 2, the squib 170 is included in an electrical circuit 220. The electrical circuit 220 includes a power source 222, which is preferably the vehicle battery and/or a capacitor, and a normally open switch 224. The switch 224 is preferably part of a deceleration sensor 226 which senses vehicle deceleration. The deceleration sensor 226 closes the switch 224 upon sensing vehicle deceleration of at least a predetermined amount which indicates the occurrence of a vehicle collision for which inflation of the air bag 12 is desired to protect an occupant of the vehicle.

When the switch 224 in the circuit 220 is closed, electric current passes through the squib 170 between the lead wires 176. The pyrotechnic material in the squib 170 is then ignited and, as described above, the squib 170 spews combustion products through the opening 158 in the closure cap 56. The combustion products emerging from the opening 158 move against and rupture the base wall 208 of the casing 204 in the igniter assembly 200. Those combustion products then move against and ignite the piece 206 of auto-ignition material which, in turn, produces combustion products that move against and ignite the compressed charge pellet 202. As noted above, the piece 206 of auto-ignition material is optional. If it were omitted, the compressed charge pellet 202 would preferably fill the compartment 214 in the casing 204 and would be ignited directly by the combustion products emitted from the squib 170.

As the compressed charged pellet 202 burns, it produces combustion products that are emitted from the compressed charge pellet 202 in opposite directions along the axis 40. The combustion products that move from the compressed charge pellet 202 in a direction extending axially from the left to the right, as viewed in FIG. 5, move against and rupture the closed end wall portion 212 of the casing 204. Those combustion products then move into the passage 120, and thus move against the ignitable surface 116 of the body 60 of gas generating material to ignite the body 60 of gas generating material at the ignitable surface 116. Specifically, those combustion products move primarily against the cylindrical inner surfaces 112 of the grains 110 of gas generating material that are closest to the igniter assembly 200, and move in progressively decreasing amounts against the cylindrical inner surfaces 112 of the other grains 110 of gas generating material that are spaced from the igniter assembly 200 along the length of the passage 120.

The combustion products that move from the compressed charge pellet 202 in the opposite direction, i.e. axially from the right to the left as viewed in FIG. 5, move primarily into the compartment 162 in the closure cap 56. Additionally, some of those combustion products move through a small gap 240 and into an annular space 242 which surrounds the projecting portion 150 of the closure cap 56. Since the compartment 162 and the space 242 are sealed by the O-ring 178 and the sealing ring 186, respectively, the combustion products in the compartment 162 and the space 242 are confined in the compartment 162 and the space 242. As a result, the gas pressures in the compartment 162 and the space 242 rapidly increase to elevated levels. The combustion products moving to the left of the compressed charge pellet 202 thus develop a thrust which acts axially against the compressed charge pellet 202 in a direction from the left to the right, as viewed in FIG. 5.

The thrust acting against the compressed charge pellet 202 is developed primarily by the combustion products in the compartment 162, because the compartment 162 is concentric with and closely adjacent to the pellet 202. Therefore, the size of the gap 240 through which the combustion products enter the space 242, and consequently the amount of the combustion products that enter the space 242, is minimized so that the thrust developed in the compartment 162 is maximized.

The thrust acting against the compressed charge pellet 202 propels the pellet 202 through the passage 120 from the igniter assembly 200 toward the pad 122 at the opposite end of the passage 120, as indicated by the arrow shown in FIG. 3. The pellet 202 is thus moved along the length of the ignitable surface 116 of the body 60 of gas generating material while the pellet 202 is burning. Such movement of the pellet 202 causes the combustion products that continue to be emitted from the pellet 202 to be dispersed over the entire area of the ignitable surface 116. The elongated body 60 of gas generating material is thus ignited rapidly throughout its entire length. Importantly, the present invention enables such rapid ignition of the body 60 of gas generating material to be accomplished directly by the combustion products emitted from the compressed charge pellet 202 without the use of a coating formed of an ignition enhancing material.

Moreover, as the compressed charge pellet 202 burns, it is consumed at a rate which is determined in part by the density of the pyrotechnic material of which it is formed. In accordance with a specific feature of the present invention, the pellet 202 is formed by forcefully packing a quantity of the respective pyrotechnic material into the size and shape of the pellet 202 with a density that is great enough to enable the pellet 202 to continue burning as it traverses the length of the ignitable surface 116. The pellet 202 can be formed by packing the pyrotechnic material directly into the base wall 210 of the casing 204, but is preferably formed separately and then inserted into the base wall 210. When the remaining portion of the pellet 202 reaches the pad 122 at the opposite end of the passage 120, it is broken by forceful impact with the pad 122 so that the combustion of the remaining pyrotechnic material is completed rapidly.

The gas generated upon combustion of the body 60 of gas generating material flows radially outward through the gas flow openings 74 (FIG. 4) in the tubular inner wall 66. The gas is then cooled and filtered as it flows radially outward from the tubular inner wall 66 through the layers 82–88 of the filter 80. The gas is at first confined within the filter 80 by the sheet 102 of rupturable pressure controlling material. When the pressure of the gas acting radially outward against the sheet 102 reaches a predetermined elevated level, it ruptures the circular portions 104 of the sheet 102 which extend across the inner ends of the gas flow openings 100 in the tubular outer wall 52. The gas then flows radially outward through the gas flow openings 100 at the predetermined elevated pressure level.

As indicated schematically by the large arrows in FIG. 2, the gas flowing radially outward from the inflator 14 is directed toward the air bag 12 by the reaction canister 16. This flow of gas causes a reduction in the gas pressure inside the reaction canister 16 adjacent to the flaps 34 and 36. The reduction in the gas pressure inside the reaction canister 16 causes ambient air outside the reaction canister 16 to flow inward through the ambient air flow openings 28 and past the flaps 34 and 36, as indicated schematically by the small arrows in FIG. 2. The ambient air mixes with the gas in the reaction canister 16 and cools the gas. The ambient air also augments the flow of gas into the air bag 12, and thus reduces the amount of gas which must be generated by the body 60 of gas generating material in the inflator 14. The air bag 12 is thus inflated into vehicle occupant compartment 18 to restrain an occupant of the vehicle.

Figure 6:
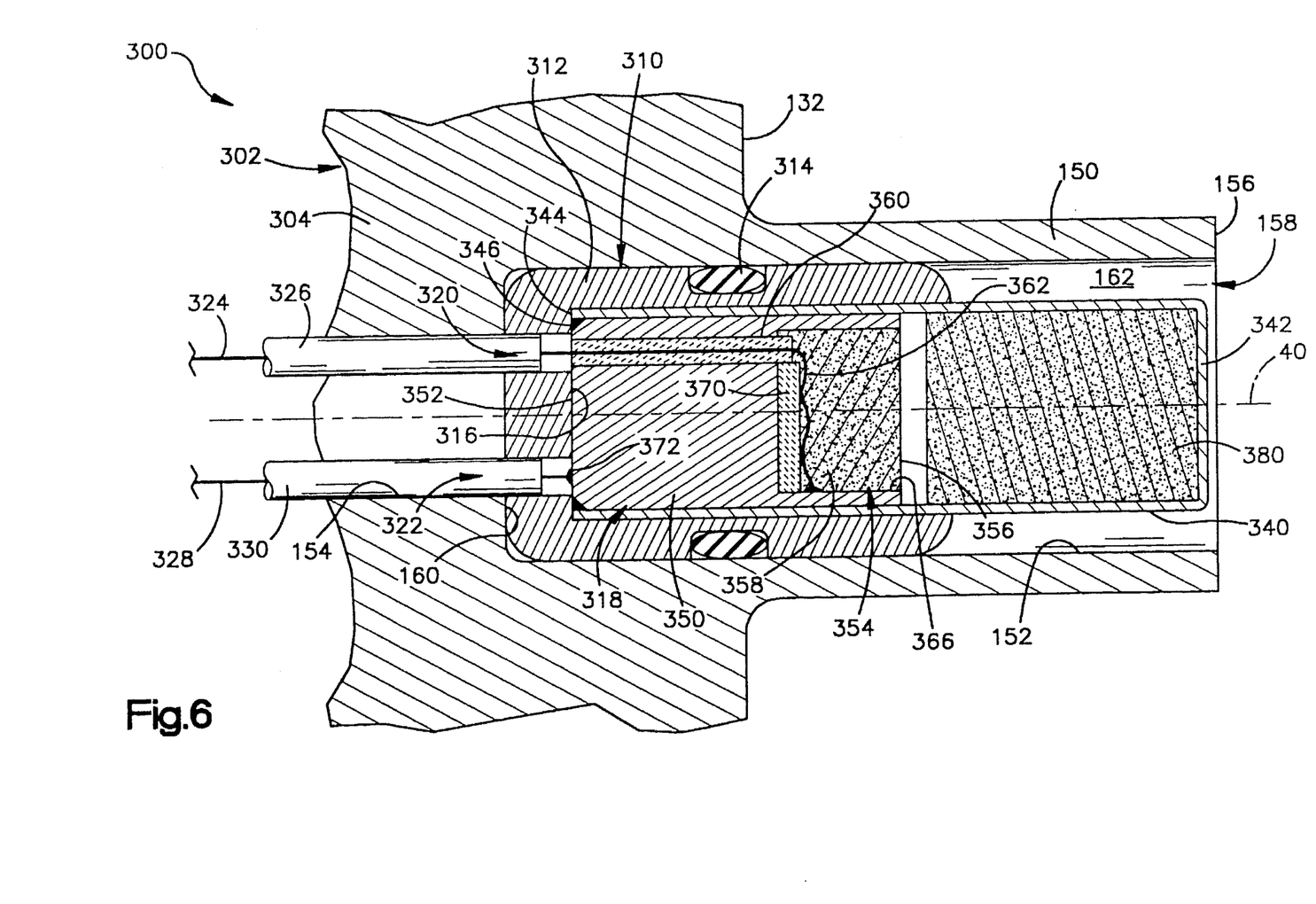
FIG. 6 is a partial sectional view of a vehicle occupant restraint apparatus comprising a second preferred embodiment of the present invention.

A vehicle occupant restraint apparatus 300 comprising a second preferred embodiment of the present invention is shown partially in FIG. 6. The apparatus 300 includes an inflator 302 with an end cap 304. As indicated by the use of the same reference numbers in FIGS. 5 and 6, the end cap 304 in the inflator 302 has parts that are substantially the same as corresponding parts of the end cap 56 in the inflator 14 described above. Such parts of the end cap 304 include a projecting portion 150, a circular opening 158, and a cylindrical inner surface 152 defining a compartment 162. However, the inflator 302 differs from the inflator 14 in that the inflator 302 does not include a squib and an igniter assembly like the squib 170 and the igniter assembly 200 (FIG. 5). Instead, the inflator 302 includes an alternative igniter assembly 310 which is a substitute for both the squib 170 and the igniter assembly 200.

The alternative igniter assembly 310 includes a cylindrical metal body 312. The body 312 is closely received in the compartment 162 in the closure cap 304. An elastomeric O-ring 314 provides a hermetic seal between the body 312 and the cylindrical inner surface 152 of the closure cap 304. The body 312 has a circular inner surface 316 centered on the axis 40 of the closure cap 304. The body 312 also has a cylindrical compartment 318 on one side of the circular inner surface 316, and a pair of cylindrical passages 320 and 322 on the other side of the circular inner surface 316. A first electrical lead wire 324 in a first insulator 326 extends into the first passage 320 in the body 312. A second electrical lead wire 328 in a second insulator 330 extends into the second passage 322 in the body 312.

A tubular metal casing 340 is closely received in the compartment 318 in the body 312. The casing 340 has a circular outer end wall 342 adjacent to the circular opening 158 in the closure cap 304. The casing 340 also has an annular inner end surface 344 adjoining the circular inner surface 316 of the body 312. A circumferentially extending weld 346 fixes the casing 340 to the body 312 at the juncture of the annular inner end surface 344 of the casing 340 and the circular inner surface 316 of the body 312.

A cylindrical metal header 350 is closely received in the casing 340. The header 350 has a circular inner end surface 352 adjoining the circular inner surface 316 of the body 312. The header 350 also has a cylindrical compartment 354. The compartment 354 in the header 350 has an open end 356 facing axially outward toward the outer end wall 342 of the casing 340. A body 358 of pyrotechnic material is contained in the compartment 354 in the header 350. Like the pyrotechnic material contained in the squib 170 described above with reference to the first embodiment of the present invention, the pyrotechnic material of which the body 358 is formed may have any suitable composition known in the art.

A glass tube 360 is received in a passage extending through the header 350 from the circular inner end surface 352 to the compartment 354. The first lead wire 324 extends outward from the first insulator 326 in the first passage 320 in the body 312, and further extends through the glass tube 360 to the compartment 354 in the header 350. A bridge wire 362 in the compartment 354 extends from the end of the first lead wire 324 to a surface 366 of the header 350. The bridge wire 362 preferably extends in contact with the body 358 of pyrotechnic material along its entire length. A ceramic shield 370 spaces the bridge wire 362 from the header 350 between the opposite ends of the bridge wire 362. The second lead wire 328 extends outward from the second insulator 330 in the second passage 322 in the body 312, and is fixed to the circular inner end surface 352 of the header 350 by a weld 372. An electrical current path thus extends from the first lead wire 324 to the second lead wire 328 through the bridge wire 362 and the header 350.

The alternative igniter assembly 310 further includes a compressed charge pellet 380. Like the compressed charge pellet 202 described above with reference to the first embodiment of the present invention, the compressed charge pellet 380 is preferably form of a pyrotechnic mixture of $TiH_2$ and $KClO_4$, but may alternatively be formed of any other suitable pyrotechnic material known in the art. The compressed charge pellet 380 also has a density such that it will burn and emit combustion products for a desired period of time. As shown in FIG. 6, the compressed charge pellet 380 is contained in the casing 340 between the header 350 and the outer end wall 342 of the casing 340. The compressed charge pellet 380 can be formed by packing the pyrotechnic material directly into the casing 340, but is preferably formed separately and then inserted into the casing 340.

The inflator 302 is actuated upon the occurrence of a predetermined amount of vehicle deceleration in the same manner as described above with reference to the inflator 14. Electric current is then directed between the first and second lead wires 324 and 328, and is thus directed through the alternative igniter assembly 310 along the bridge wire 362. The bridge wire 362 is then resistively heated along its entire length and, as a result, the body 358 of pyrotechnic material is ignited. The body 358 of pyrotechnic material then generates and emits combustion products which move against the compressed charge pellet 380 to ignite the pellet 380.

As the compressed charge pellet 380 burns, it produces combustion products that are emitted from the pellet 380 in opposite directions along the axis 40. The combustion products that move from the pellet 380 in a direction extending axially from the left to the right, as viewed in FIG. 6, move against and rupture the outer end wall 342 of the casing 340. The combustion products that move from the pellet 380 in the opposite direction, i.e., axially from the right to the left as viewed in FIG. 6, are confined in the casing 340. Those combustion products develop a thrust which acts axially against the pellet 380 in a direction from the left to the right. The thrust acting against the pellet 380 propels the pellet 380 outward from the casing 340 past the ruptured outer end wall 342, through the opening 158 in the closure cap 304, and away from the closure cap 304 along the axis 40. The compressed charge pellet 380 is thus propelled along the axis 40 so as to disperse its combustion products over an ignitable surface portion of a body of gas generating material like the body 60 of gas generating material described above.

From the above description of the invention, those skilled in the art will perceive improvements, changes and modifications. Such improvements, changes and modifications within the skill of the art are intended to be covered by the appended claims.

Having described the invention, the following is claimed:

1. A method of igniting a body of ignitable gas generating material which, when ignited, generates gas for inflating an inflatable vehicle occupant restraint, the body of gas generating material having an ignitable surface portion, said method comprising the steps of:

igniting a body of pyrotechnic material which, when ignited, emits combustion products; and igniting the body of gas generating material by dispersing said combustion products over the ignitable surface portion of the body of gas generating material;

said combustion products being dispersed by moving said body of pyrotechnic material from a first location to a second location when said body of pyrotechnic material is burning, said first and second locations being spaced from each other across the ignitable surface portion of the body of gas generating material.

2. A method as defined in claim 1 wherein the body of gas generating material has an elongated cylindrical shape and is ignited directly by said combustion products.

3. A method as defined in claim 1 wherein said step of moving said body of pyrotechnic material includes the step of confining said combustion products so as to cause said combustion products to develop a thrust which moves said body of pyrotechnic material.

4. A method as defined in claim 1 wherein said body of pyrotechnic material is moved along a predetermined path of movement extending from said first location to said second location.

5. A method as defined in claim 1 wherein said body of pyrotechnic material is moved in a straight line extending from said first location to said second location.

6. A method as defined in claim 1 wherein the ignitable surface portion of the body of gas generating material has an elongated shape, said body of pyrotechnic material being moved along the entire length of the ignitable surface portion of the body of gas generating material.

7. A method as defined in claim 1 wherein the ignitable surface portion of the body of gas generating material defines a cylindrical passage with a longitudinal central axis, said body of pyrotechnic material being moved within said passage along said axis.

8. A method as defined in claim 7 wherein said body of pyrotechnic material is moved along the entire length of said passage.

9. Apparatus for igniting a body of ignitable gas generating material which, when ignited, generates gas for inflating an inflatable vehicle occupant restraint, the body of gas generating material having an ignitable surface portion, said apparatus comprising:

a body of pyrotechnic material which, when ignited, emits combustion products; and igniter means for igniting said body of pyrotechnic material and for igniting the body of gas generating material by dispersing said combustion products over the ignitable surface portion of the body of gas generating material;

said igniter means dispersing said combustion products by moving said body of pyrotechnic material from a first location to a second location when said body of pyrotechnic material is burning, said first and second locations being spaced from each other across the ignitable surface portion of the body of gas generating material.

10. Apparatus as defined in claim 9 wherein said igniter means includes means for confining said combustion products so as to cause said combustion products to develop a thrust which moves said body of pyrotechnic material.

11. Apparatus as defined in claim 9 wherein said igniter means moves said body of pyrotechnic material along a predetermined path of movement extending from said first location to said second location.

12. Apparatus as defined in claim 11 wherein said predetermined path of movement extends in a straight line from said first location to said second location.

13. Apparatus as defined in claim 9 wherein said body of pyrotechnic material is a first body of pyrotechnic material, said igniter means including an igniter having a casing containing a second body of pyrotechnic material and having means for igniting said second body of pyrotechnic material, said second body of pyrotechnic material, when ignited, emitting combustion products which emerge from said casing and move against said first body of pyrotechnic material to ignite said first body of pyrotechnic material.

14. Apparatus as defined in claim 13 wherein said first body of pyrotechnic material is contained in a casing separate from said casing in which said second body of pyrotechnic material is contained.

15. Apparatus as defined in claim 9 wherein said body of pyrotechnic material is a first body of pyrotechnic material, said igniter means including a second body of pyrotechnic material and a casing which contains said first and second bodies of pyrotechnic material, said second body of pyrotechnic material, when ignited, emitting combustion products which move against said first body of pyrotechnic material to ignite said first body of pyrotechnic material, said combustion products emitted by said first body of pyrotechnic material rupturing said casing and emerging from said casing.

16. Apparatus as defined in claim 15 wherein said igniter means includes means for confining said combustion products emitted by said first body of pyrotechnic material so as to cause said combustion products emitted by said first body of pyrotechnic material to develop a thrust which propels said first body of pyrotechnic material outward from said casing.

17. Apparatus for use in inflating an inflatable vehicle occupant restraint, said apparatus comprising:

a body of ignitable gas generating material which, when ignited, generates gas for inflating the vehicle occupant restraint, said body of gas generating material having an ignitable surface portion;

a body of pyrotechnic material which, when ignited, emits combustion products; and means for igniting said body of pyrotechnic material and for moving said body of pyrotechnic material from a first location to a second location when said body of pyrotechnic material is burning thereby igniting the body of gas generating material by dispersing said combustion products over said ignitable surface portion, said first and second locations being spaced from each other across said ignitable surface portion of said body of gas generating material.

18. Apparatus as defined in claim 17 wherein said body of gas generating material has an elongated cylindrical shape, said ignitable surface portion of said body of gas generating material being free of a coating formed of an ignition-enhancing material.

19. Apparatus as defined in claim 17 wherein said means for moving said body of pyrotechnic material includes means for confining said combustion products so as to cause said combustion products to develop a thrust which moves said body of pyrotechnic material.

20. Apparatus as defined in claim 17 wherein said means for moving said body of pyrotechnic material moves said body of pyrotechnic material along a predetermined path of movement extending from said first location to said second location.

21. Apparatus as defined in claim 20 wherein said predetermined path of movement extends in a straight line from said first location to said second location.

22. Apparatus as defined in claim 17 wherein said ignitable surface portion of said body of gas generating material has an elongated shape with first and second longitudinally opposite ends, said first location being adjacent to said first end, said second location being adjacent to said second end.

23. Apparatus as defined in claim 17 wherein said ignitable surface portion of said body of gas generating material defines a cylindrical passage with a longitudinal central axis, said predetermined path of movement extending within said cylindrical passage along said axis.

24. Apparatus as defined in claim 23 wherein said body of gas generating material comprises a plurality of separate pieces of gas generating material, each of said pieces of gas generating material having a cylindrical inner surface defining a respective portion of said cylindrical passage.

25. Apparatus as defined in claim 24 wherein at least a plurality of said pieces of gas generating material are free of a coating formed of an ignition enhancing material.

26. Apparatus as defined in claim 17 wherein said body of pyrotechnic material is a first body of pyrotechnic material, said igniter means including an igniter having a casing containing a second body of pyrotechnic material and having means for igniting said second body of pyrotechnic material, said second body of pyrotechnic material, when ignited, emitting combustion products which emerge from said casing and move against said first body of pyrotechnic material to ignite said first body of pyrotechnic material.

27. Apparatus as defined in claim 26 wherein said first body of pyrotechnic material is contained in a casing separate from said casing in which said second body of pyrotechnic material is contained.

28. Apparatus as defined in claim 17 wherein said body of pyrotechnic material is a first body of pyrotechnic material, said igniter means including a second body of pyrotechnic material and a casing which contains said first and second bodies of pyrotechnic material, said second body of pyrotechnic material, when ignited, emitting combustion products which move against said first body of pyrotechnic material to ignite said first body of pyrotechnic material, said combustion products emitted by said first body of pyrotechnic material rupturing said casing and emerging from said casing.

29. Apparatus as defined in claim 28 wherein said igniter means includes means for confining said combustion products emitted by said first body of pyrotechnic material so as to cause said combustion products emitted by said first body of pyrotechnic material to develop a thrust which propels said first body of pyrotechnic material outward from said casing.

* * * * *